W. Y. ELLIOTT.
HARROW.
APPLICATION FILED APR. 14, 1920.
1,388,993.
Patented Aug. 30, 1921.
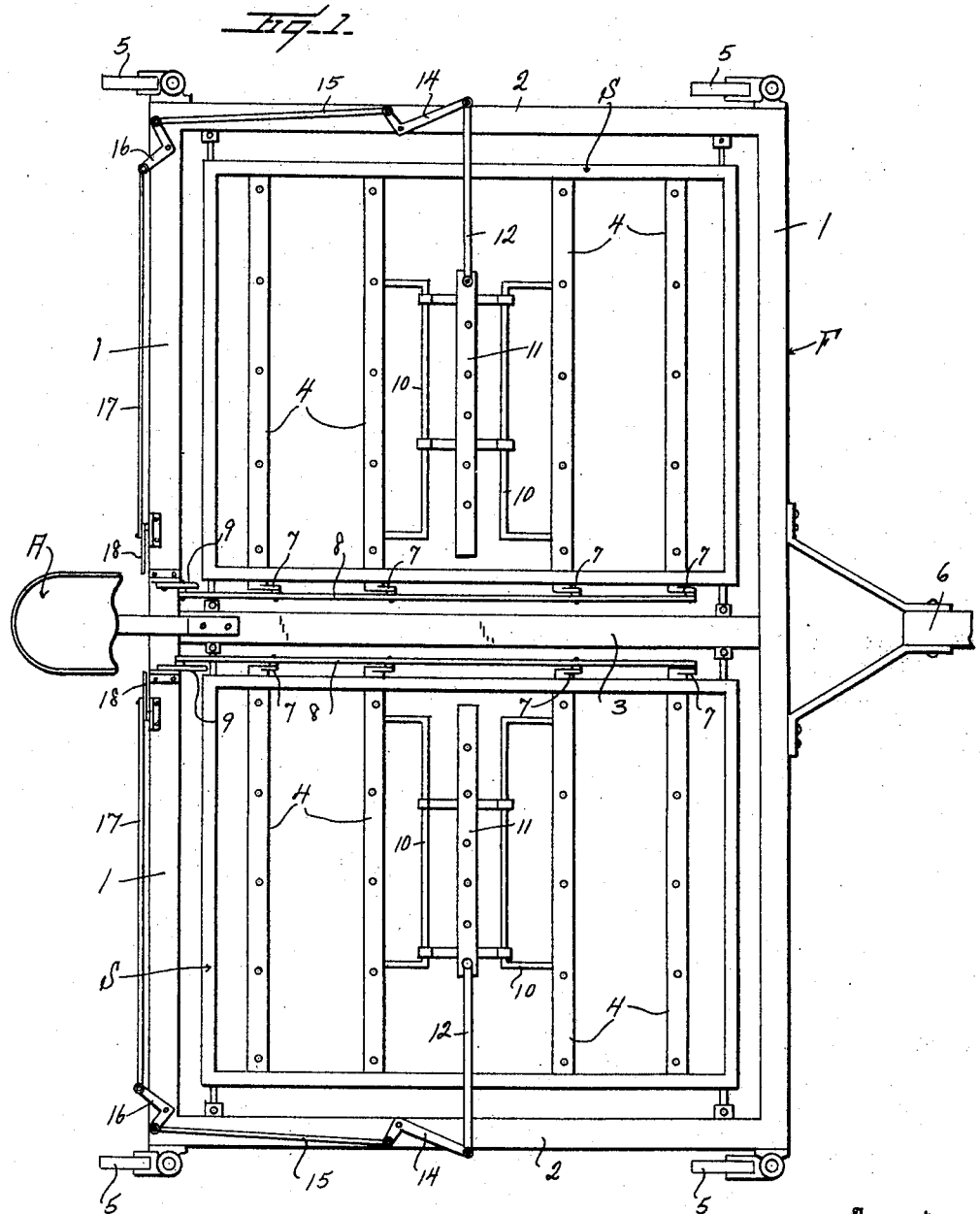
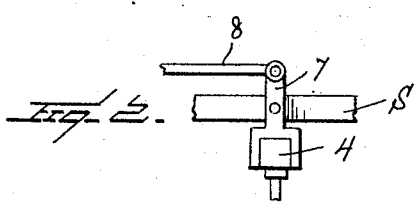
Inventor
W. Y. Elliott
By Watson E. Coleman
Attorney

UNITED STATES PATENT OFFICE.

WILLIAM YANCEY ELLIOTT, OF DEER LODGE, MONTANA.

HARROW.

1,388,993. Specification of Letters Patent. Patented Aug. 30, 1921.

Application filed April 14, 1920. Serial No. 373,785.

*To all whom it may concern:*

Be it known that I, WILLIAM YANCEY ELLIOTT, a citizen of the United States, residing at Deer Lodge, in the county of Powell and State of Montana, have invented certain new and useful Improvements in Harrows, of which the following is a specification, reference being had to the accompanying drawings.

This invention relates to certain improvements in harrows, and it is an object of the invention to provide a device of this general character including novel and improved means whereby the same may be conveniently and effectively employed as a cultivator.

Another object of the invention is to provide a novel and improved device of this general character including harrow sections, and wherein each of said sections is provided with a ground working member movable in a direction toward the space between adjacent sections, in order to facilitate the use of the device as a cultivator.

The invention consists in the details of construction and in the combination and arrangement of the several parts of my improved harrow whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a harrow constructed in accordance with an embodiment of my invention, and, Fig. 2 is a fragmentary view in side elevation illustrating a mounting for one of the teeth carrying bars, as herein disclosed.

As disclosed in the accompanying drawings F denotes a main frame of desired dimensions, preferably oblong in top plan. The longitudinal members 1 of the frame, together with the end members 2 are preferably U shape in cross section. Connecting the central portions of the members 1 is an intermediate cross member 3, also preferably U shape in cross section. Supported by the member 3 and the end members 2 are the harrow sections S.

Each of the harrow sections S comprises a plurality of teeth carrying bars 4 extending in a direction longitudinally of the frame F, and which are supported for rocking movement, so that when required or desired, said bars 4 may be moved to raise the teeth thereof out of working position. The teeth may be of a spike or spring type, as preferred.

The frame F is supported adjacent each of the corners thereof by the wheels 5, preferably of a caster type, so that the device may be readily transported. The forward longitudinal member 1 has engaged with the central portion thereof a draft tongue 6 or the like, so that the device may be readily moved by team or otherwise.

Each of the teeth carrying bars 4 at the inner ends is provided with upstanding rock arms 7 to which is operatively engaged an elongated rod 8, whereby the bars 4 may be readily rocked in unison. The rear portion of the rod 8 is engaged with a lever 9 carried by the frame F and positioned in close proximity to the seat structure A, so that said bars 4 may be conveniently rocked by the occupant of said structure A.

A pair of adjacent bars 4 of each of the sections S is provided with the opposed guideways 10, with which is slidably engaged a tooth carrying bar 11, which is adapted to be swung in a direction toward the center member 3, whereby desired action may be had upon the surface of the ground between the harrow sections.

The outer end of each of the bars 11 engages therewith a rod 12, which is also engaged with a bell crank lever 14 mounted upon the adjacent end member 2 of the frame F. Said bell crank lever 14 has also engaged therewith a second rod 15, engaged with a bell crank lever 16 mounted upon the rear member 1 of the frame F. This second bell crank lever 16 has also engaged therewith a rod 17 leading to a lever 18, positioned adjacent the seat structure A. By proper moving of the lever 18 the bar 11 may be moved toward or from the center member 3, as the occasions of practice may require.

When it is desired to employ my improved device as a cultivator, certain of the teeth of the bars 4 and 11 are removed, and by moving the bars 11 in a direction toward the center beam 3 effective cultivation may be had in close proximity to the plants and at opposite sides of a row.

It is to be understood that the connections between the guideways 10 and the coacting bars 4 are sufficiently loose to compensate for the rocking of the bars 4.

From the foregoing description it is thought to be obvious that a harrow constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with a harrow section, including a frame and teeth carrying bars, guide ways carried by adjacent bars, and a supplemental tooth carrying bar slidably engaged with the guide ways.

2. In combination with a harrow section, including a frame and teeth carrying bars, guide ways carried by adjacent bars, and a supplemental tooth carrying bar slidably engaged with the guide ways, said supplemental tooth carrying bar being of a length to extend beyond a side of the frame upon movement of said supplemental bar in one direction.

3. In combination with a harrow section, including a frame and teeth carrying bars, guide ways carried by adjacent bars, a supplemental tooth carrying bar slidably engaged with the guide ways, said supplemental tooth carrying bar being of a length to extend beyond a side of the frame upon movement of said supplemental bar in one direction, and means for extending or retracting the supplemental tooth carrying bar.

In testimony whereof I hereunto affix my signature.

WM. YANCEY ELLIOTT.